(12) United States Patent
Choi

(10) Patent No.: US 11,437,172 B2
(45) Date of Patent: Sep. 6, 2022

(54) MAGNETIC FORCE CONTROL DEVICE AND MAGNETIC BODY HOLDING DEVICE USING SAME

(71) Applicant: Tae Kwang Choi, Gwangmyeong-si (KR)

(72) Inventor: Tae Kwang Choi, Gwangmyeong-si (KR)

( * ) Notice: Subject to any disclaimer, the term of this patent is extended or adjusted under 35 U.S.C. 154(b) by 0 days.

(21) Appl. No.: 17/181,801

(22) Filed: Feb. 22, 2021

(65) Prior Publication Data

US 2021/0265093 A1 Aug. 26, 2021

(30) Foreign Application Priority Data

Feb. 26, 2020 (KR) .................. 10-2020-0023422
Jun. 5, 2020 (KR) .................. 10-2020-0068587

(51) Int. Cl.
*H01F 7/14* (2006.01)
*H01F 7/04* (2006.01)
*H01F 7/122* (2006.01)
*H01F 7/126* (2006.01)
*B23Q 3/154* (2006.01)

(52) U.S. Cl.
CPC ............. *H01F 7/14* (2013.01); *B23Q 3/1546* (2013.01); *H01F 7/04* (2013.01); *H01F 7/122* (2013.01); *H01F 7/126* (2013.01)

(58) Field of Classification Search
CPC ... H01F 7/14; H01F 7/04; H01F 7/122; H01F 7/126; B23Q 3/1546
See application file for complete search history.

(56) References Cited

U.S. PATENT DOCUMENTS

| | | | |
|---|---|---|---|
| 2012/0092098 A1* | 4/2012 | Choi | H01H 51/065 335/189 |
| 2016/0005519 A1* | 1/2016 | Choi | H01F 7/0257 335/290 |
| 2020/0185137 A1* | 6/2020 | Morton | H01F 7/17 |
| 2020/0203048 A1* | 6/2020 | Choi | H01F 7/04 |

FOREIGN PATENT DOCUMENTS

| | | |
|---|---|---|
| CN | 110612581 A | 12/2019 |
| KR | 10-1983-0001601 B1 | 8/1983 |
| KR | 10-2011-0044681 A | 4/2011 |
| KR | 10-1131134 B1 | 4/2012 |
| KR | 10-2016-0090155 A | 7/2016 |
| KR | 10-1823247 B1 | 1/2018 |
| KR | 10-2019-0031133 A | 3/2019 |
| KR | 10-2019-0071595 A | 6/2019 |

OTHER PUBLICATIONS

Machine translation of Choi [KR20110044681A] (Year: 2011).*

* cited by examiner

*Primary Examiner* — Bernard Rojas
(74) *Attorney, Agent, or Firm* — Invenstone Patent, LLC

(57) ABSTRACT

Disclosed is a magnetic force control device improved to be installed even in a narrow space having a small height. The magnetic force control device includes a first pole piece having a first interaction surface, a second pole piece having a second interaction surface, a third pole piece connected to the second pole piece, a coil wound around at least one of the second pole piece and the third pole piece, a stationary magnet fixed between the first pole piece and the second pole piece and a rotary magnet disposed between the first pole piece and the third pole piece and configured to be rotatable by controlling a current flowing through the coil.

7 Claims, 10 Drawing Sheets

MAGNETIC FORCE CONTROL DEVICE AND MAGNETIC BODY HOLDING DEVICE USING SAME

CROSS-REFERENCE TO RELATED APPLICATIONS

This application claims the priority of Korean Patent Application No 10-2020-0023422 filed on Feb. 26, 2020, and Korean Patent Application No 10-2020-0068587 filed on Jun. 5, 2020, in the Korean Intellectual Property Office, the disclosure of which is incorporated herein by reference.

BACKGROUND

Field

The present disclosure relates to a magnetic force control device configured to control magnetic force to hold a magnetic body, and to a magnetic body holding device using the magnetic force control device.

Description of the Related Art

A magnetic body holding device, such as a permanent magnet workpiece holding device, refers to a device used to attach, by using a magnetic force, an attachment object made of a magnetic material such as iron. Recently, the magnetic body holding device is widely used as a mold clamp for an injection machine, a mold clamp for a press device, a chuck for a machine tool, or the like.

The magnetic body holding device attaches the attachment object, which is a magnetic body, to an interaction surface by using high magnetic force of a permanent magnet in order to hold the attachment object, and the magnetic body holding device separates the attachment object from the interaction surface by preventing a magnetic flow of the permanent magnet from being formed on the interaction surface in order to release the attachment object.

In the related art, there is disclosed a magnetic force control device that holds or releases an object by changing a magnetic flow in the device by rotating a permanent magnet (see Patent Document 1).

In the magnetic force control device disclosed in Patent Document 1, a permanent magnet and a rotary permanent magnet are disposed between pole pieces disposed at both sides, and the permanent magnet and the rotary permanent magnet are arranged in an up-down direction (or a vertical direction). In the case of the magnetic force control device disclosed in Patent Document 1, because a height of the magnetic force control device in the up-down direction is large, the magnetic force control device cannot be applied to a structure in which an installation space for the magnetic force control device is narrow, particularly, a structure in which a height of the installation space is small. As a result, there is a problem in that the structure to which the magnetic force control device may be applied is greatly restricted spatially.

In addition, in the case of the structure of the magnetic force control device disclosed in Patent Document 1, if an overall size of the magnetic force control device is reduced to reduce a height of the magnetic force control device, there is a problem in that holding force for holding a holding object is decreased.

In addition, if an overall size of the magnetic force control device is reduced, an interval between the pole pieces is also reduced. In this case, there is concern that the holding object is released as the rotary permanent magnet is inadvertently rotated by external force in the state in which the holding object is held.

(Patent Document 1)
Korean Patent Application Laid-Open No. 10-2019-0031133 (entitled MAGNETIC FORCE CONTROL DEVICE AND MAGNETIC BODY HOLDING DEVICE USING SAME)

SUMMARY

An object to be achieved by the present disclosure is to provide a magnetic force control device improved to be installed even in a narrow space having a small height, and a magnetic body holding device using the magnetic force control device.

Another object to be achieved by the present disclosure is to provide a magnetic force control device improved to stably hold or release a magnetic body even with low electric power, and a magnetic body holding device using the magnetic force control device.

Technical problems of the present disclosure are not limited to the aforementioned technical problems, and other technical problems, which are not mentioned above, may be clearly understood by those skilled in the art from the following descriptions.

In order to achieve the objects, a magnetic force control device according to an exemplary embodiment of the present disclosure includes: a first pole piece having a first interaction surface; a second pole piece having a second interaction surface; a third pole piece connected to the second pole piece; a coil wound around at least one of the second pole piece and the third pole piece; a stationary magnet fixed between the first pole piece and the second pole piece; and a rotary magnet disposed between the first pole piece and the third pole piece and configured to be rotatable by controlling a current flowing through the coil, in which the rotary magnet and the stationary magnet form a closed magnetic loop as the rotary magnet rotates, or the rotary magnet and the stationary magnet form a magnetic flow that diverges through the first interaction surface and the second interaction surface.

The second pole piece and the third pole piece may be integrally formed.

The coil may be disposed between the stationary magnet and the third pole piece.

The stationary magnet may be disposed to be closer to the second interaction surface than the coil.

The stationary magnet may be disposed to be closer to the first interaction surface than a rotation center of the rotary magnet.

The stationary magnet may be disposed to be closer to the first interaction surface than the rotary magnet.

The coil may be disposed between the rotary magnet and the second pole piece.

A magnetic force control device according to another exemplary embodiment of the present disclosure includes: a first pole piece assembly having a first stationary permanent magnet, a first rotary permanent magnet, and a plurality of pole pieces disposed to provide a magnetic path; a second pole piece assembly having a second stationary permanent magnet, a second rotary permanent magnet, and a plurality of pole pieces disposed to provide a magnetic path; a diamagnetic body disposed between the first pole piece assembly and the second pole piece assembly; and a coil shared by the first pole piece assembly and the second pole piece assembly.

The coil may be wound around any one pole piece of the first pole piece assembly and any one pole piece of the second pole piece assembly.

The coil may be wound around the diamagnetic body, at least one portion of a first magnetic body holding module which adjoins the diamagnetic body, and one portion of the second magnetic body which adjoins the diamagnetic body.

The first pole piece assembly may have first and second pole pieces configured to support the first stationary permanent magnet, and a third pole piece connected to the second pole piece and configured to form a space for receiving the first rotary permanent magnet together with the first pole piece, the second pole piece assembly may have fourth and fifth pole pieces configured to support the second stationary permanent magnet, and a sixth pole piece connected to the fifth pole piece and configured to form a space for receiving the first rotary permanent magnet together with the fourth pole piece, and the coil may be configured to be wound around the second pole piece and the fifth pole piece.

The diamagnetic body may be disposed between the second pole piece and the fifth pole piece.

The first pole piece assembly and the second pole piece assembly may be disposed in a horizontal direction.

Interaction surfaces of the first pole piece assembly and interaction surfaces of the second pole piece assembly may be disposed in parallel with one another in the horizontal direction so as to hold a single holding object.

The first pole piece assembly may have first and second pole pieces configured to support the first stationary permanent magnet, and a third pole piece connected to the second pole piece and configured to form a space for receiving the first rotary permanent magnet together with the first pole piece, the second pole piece assembly may have fourth and fifth pole pieces configured to support the second stationary permanent magnet, and a sixth pole piece connected to the fifth pole piece and configured to form a space for receiving the first rotary permanent magnet together with the fourth pole piece, and the coil may be configured to be wound around the third pole piece and the sixth pole piece.

The diamagnetic body may be disposed between the third pole piece and the sixth pole piece.

The first pole piece assembly and the second pole piece assembly may be disposed in a vertical direction.

The interaction surfaces of the first pole piece assembly may be disposed to be directed in a first direction, and the interaction surfaces of the second pole piece assembly may be disposed to be directed in a second direction opposite to the first direction, such that the interaction surfaces may individually hold different holding objects.

A magnetic body holding device according to another exemplary embodiment of the present disclosure may include the configuration of the magnetic force control device described above.

In addition, a magnetic force control device according to still another exemplary embodiment of the present disclosure may include: a first pole piece assembly having a first stationary permanent magnet, a first rotary permanent magnet, and a plurality of pole pieces disposed to provide a magnetic path; a second pole piece assembly having a second stationary permanent magnet, a second rotary permanent magnet, and a plurality of pole pieces disposed to provide a magnetic path; and a coil shared by the first pole piece assembly and the second pole piece assembly, in which at least one of the plurality of pole pieces of the first pole piece assembly is disposed to be in contact with at least one of the plurality of pole pieces of the second pole piece assembly.

In addition, a magnetic force control device according to yet another exemplary embodiment of the present disclosure may include: a first pole piece assembly having a first stationary permanent magnet, a first rotary permanent magnet, and a plurality of pole pieces disposed to provide a magnetic path; a second pole piece assembly having a second stationary permanent magnet, a second rotary permanent magnet, and a plurality of pole pieces disposed to provide a magnetic path; and a coil shared by the first pole piece assembly and the second pole piece assembly, in which at least one of the plurality of pole pieces of the first pole piece assembly is formed integrally with at least one of the plurality of pole pieces of the second pole piece assembly.

According to the present disclosure, there is no restriction to the size of the installation space in which the magnetic force control device is installed, thereby improving spatial utilization.

In addition, the magnetic force control device may stably hold the magnetic body by rotating the rotary magnet with low electric power, thereby improving efficiency in operating the magnetic force control device.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1A:
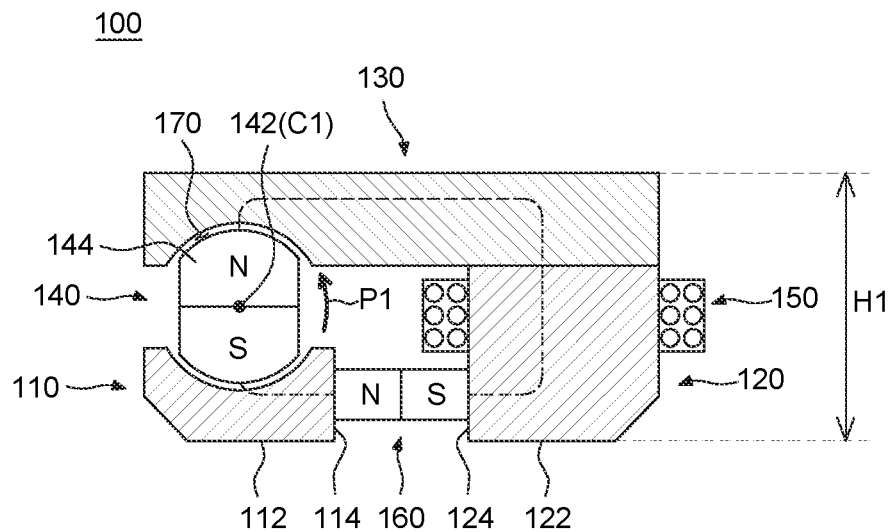
FIGS. 1A to 1D are views schematically illustrating a magnetic force control device according to an exemplary embodiment of the present disclosure.

Hereinafter, various exemplary embodiments will be described in more detail with reference to the accompanying drawings. The exemplary embodiments disclosed in the present specification may be variously modified. Specific exemplary embodiments will be illustrated in the drawings and described in detail in the detailed description. However, the specific embodiments illustrated in the accompanying drawings are merely intended to facilitate understanding of various embodiments. Therefore, the technical spirit is not limited by the specific embodiments illustrated in the accompanying drawings, and the scope of the present disclosure should be understood as including all equivalents or substitutes included in the spirit and technical scope of the present disclosure.

In the present specification, in a case in which it is described that a first constituent element is formed "on" a second constituent element, this case does not exclude a configuration in which a third constituent element is interposed between the first and second constituent elements.

That is, the first constituent element may be in direct contact with the second constituent element or the third constituent element may be interposed between the first and second constituent elements.

The terms including ordinal numbers such as 'first,' 'second,' and the like may be used to describe various constituent elements, but the constituent elements are not limited by the terms. These terms are used only to distinguish one constituent element from another constituent element.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof. When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

Meanwhile, the term "module" or "unit" used for a constituent element used in the present specification performs at least one function or operation. Further, the "module" or "unit" may perform the function or operation by hardware, software, or a combination of hardware and software. In addition, except for the "module" or "unit" that should be performed in specific hardware or performed by at least one processor, a plurality of "modules" or a plurality of "units" may be integrated into at least one module. Singular expressions include plural expressions unless clearly described as different meanings in the context.

In addition, in the description of the present disclosure, the specific descriptions of related well-known functions or configurations will be summarized or omitted when it is determined that the specific descriptions may unnecessarily obscure the subject matter of the present disclosure.

Hereinafter, exemplary embodiments of a magnetic force control device according to the present disclosure will be described with reference to the accompanying drawings.

A magnetic force control device according to the present disclosure refers to a device controlled to generate or not to generate magnetic force by changing magnetic characteristics on an interaction surface. The magnetic force control device according to the present disclosure may be comprehensively used for a magnetic body holding device, a power device, and the like. Hereinafter, an example in which the magnetic force control device is used for the magnetic body holding device will be described. However, the application of the magnetic force control device is not limited thereto.

FIGS. 1A to 1D are views schematically illustrating a magnetic force control device according to an exemplary embodiment of the present disclosure.

Referring to FIGS. 1A to 1D, a magnetic force control device 100 includes a first pole piece 110, a second pole piece 120, a third pole piece 130, a rotary magnet 140, a coil 150, and a stationary magnet 160.

The first pole piece 110 is made of a ferromagnetic material such as iron capable of forming a path through which magnetism may flow. The first pole piece 110 includes a first interaction surface 112 and a first support surface 114.

The first interaction surface 112 is provided at one outer end of the first pole piece 110. When a magnetic flow is formed on the first interaction surface 112, a holding object 1 having magnetism may be held on the first interaction surface 112.

The first support surface 114 is provided at one side of the first pole piece 110. The first support surface 114 is in contact with one end of the stationary magnet 160 to support the stationary magnet 160. FIGS. 1A to 1D illustrate the structure in which the first support surface 114 is in contact with the N-pole of the stationary magnet 160, but a structure in which the first support surface 114 is in contact with the S-pole of the stationary magnet 160 may also be applied.

The second pole piece 120 is disposed to be spaced apart from the first pole piece 110 with the stationary magnet 160 interposed therebetween.

The second pole piece 120 is made of a ferromagnetic material such as iron capable of forming a path through which magnetism may flow. The second pole piece 120 includes a second interaction surface 122 and a second support surface 124.

The second interaction surface 122 is provided at one outer end of the second pole piece 120. When a magnetic flow is formed on the second interaction surface 122, the object 1 having magnetism may be held on the second interaction surface 122. The second interaction surface 122 is disposed in parallel with the first interaction surface 112 in a horizontal direction so as to be stably in contact with the object 1.

When the magnetic flow is formed on the first interaction surface 112 and the second interaction surface 122, the holding object 1 may come into contact with the first interaction surface 112 and the second interaction surface 122. When the holding object 1 is in contact with the first interaction surface 112 and the second interaction surface 122, the holding object 1 forms the magnetic flow together with the first pole piece 110 and the second pole piece 120 and is held by the magnetic force control device 100.

The second support surface 124 is provided at one side of the second pole piece 120. The second support surface 124 is disposed to face the first support surface 114.

The second support surface 124 is in contact with the other end of the stationary magnet 160 to support the stationary magnet 160. FIGS. 1A to 1D illustrate the structure in which the second support surface 124 is in contact with the S-pole of the stationary magnet 160, but a structure in which the second support surface 124 is in contact with the N-pole of the stationary magnet 160 may also be applied.

The third pole piece 130 is connected to an upper end of the second pole piece 120 and disposed to be spaced apart from the first pole piece 110 with the rotary magnet 140 interposed therebetween. The third pole piece 130 is disposed above the first pole piece 110 and the second pole piece 120.

The third pole piece 130 is made of a ferromagnetic material such as iron capable of forming a path through which magnetism may flow. The third pole piece 130 has a receiving portion 170 that receives the rotary magnet 140 together with the first pole piece 110. The receiving portion 170 receives the rotary magnet 140 and includes a rotation path P1 for the rotary magnet 140.

The structure in which the third pole piece 130 is provided separately from the second pole piece 120 and connected to the upper end of the second pole piece 120 has been described above. However, the present disclosure is not limited thereto, and a structure in which the third pole piece 130 and the second pole piece 120 are integrally formed may also be applied. In this case, the second pole piece 120 and the third pole piece 130 may be formed into a single body, one end of the single body is disposed to be spaced apart from the first pole piece 110 with the rotary magnet 140 interposed therebetween, and the other end of the single body is bent from one end of the single body and disposed to be spaced apart from the first pole piece 110 with the stationary magnet 160 interposed therebetween.

The coil 150 may be wound around at least one of the second pole piece 120 and the third pole piece 130. FIGS. 1A to 1D illustrate the structure in which the coil 150 is wound around the second pole piece 120, but a structure in which the coil 150 is wound around the third pole piece 130 or a structure in which the coil 150 is wound around both the second pole piece 120 and the third pole piece 130 may also be applied.

As illustrated in FIGS. 1A to 1D, the coil 150 is disposed between the stationary magnet 160 and the third pole piece 130 in the structure in which the coil 150 is wound around the second pole piece 120. Although not illustrated, in the case of the structure in which the coil 150 is wound around the third pole piece 130, the coil 150 may be disposed between the rotary magnet 140 and the second pole piece 120.

The coil 150 is disposed on a magnetic flow between the stationary magnet 160 and the rotary magnet 140.

When the current flows through the coil 150, the magnetic flow is formed in a predetermined direction by Ampere's right-handed screw rule, and the N-pole and the S-pole are formed in the direction of the magnetic flow on the second pole piece 120 around which the coil 150 is wound. That is, it can be seen that the coil 150 and one portion of the second pole piece 120 around which the coil 150 is wound serve as an electromagnet.

The stationary magnet 160 is a permanent magnet, the N-pole of the stationary magnet 160 is disposed to be in contact with the first pole piece 110, and the S-pole of the stationary magnet 160 is disposed to be in contact with the second pole piece 120. The stationary magnet 160 may be disposed to be closer to the first interaction surface 112 and the second interaction surface 122 than the rotary magnet 140 and a rotation center C1 of the rotary magnet 140.

The rotary magnet 140 includes a permanent magnet 144 and a rotary shaft 142 disposed rotatably. The permanent magnet 144 is disposed to be rotatable about the rotary shaft 142.

The rotary magnet 140 is disposed to be rotatable between a first position (see FIG. 1A) at which the S-pole of the rotary magnet 140 is adjacent to the first pole piece 110 and magnetically connected to the first pole piece 110 and the N-pole of the rotary magnet 140 is adjacent to the third pole piece 130 and magnetically connected to the third pole piece 130 and a second position (see FIG. 1C) at which the N-pole of the rotary magnet 140 is adjacent to the first pole piece 110 and magnetically connected to the first pole piece 110 and the S-pole of the rotary magnet 140 is adjacent to the third pole piece 130 and magnetically connected to the third pole piece 130.

The configuration in which the rotary magnet 140 is "magnetically connected to" the first pole piece 110 or the third pole piece 130 includes a case in which the rotary magnet 140 is spaced apart from the first pole piece 110 or the third pole piece 130 to the extent that the magnetic flow may be formed on the first pole piece 110 or the third pole piece 130 by the rotary magnet 140 even though the rotary magnet 140 is not physically in direct contact with the first pole piece 110 or the third pole piece 130.

For example, it can be said that the rotary magnet 140 is magnetically connected to the first pole piece 110 or the third pole piece 130 when the magnetic flow having intensity, which is equal to or higher than A % of intensity of the magnetic flow generated when the rotary magnet 140 comes into contact with the first pole piece 110 or the third pole piece 130, is formed on the first pole piece 110 or the third pole piece 130. In this case, A may be 80, 70, 60, 50, 40, 30, 20, or the like.

The rotary magnet 140 is disposed to be spaced apart from the stationary magnet 160 even in the horizontal direction. Therefore, an overall height H1 of the magnetic force control device 100 may be reduced, the magnetic force control device 100 may be compact, and high holding force may be maintained.

Hereinafter, a principle of holding the holding object 1, which is a magnetic body, or releasing the holding object 1 will be described with reference back to FIGS. 1A to 1D.

First, referring to FIG. 1A, when no power is applied to the coil 150 and thus no current flows, a portion of the first pole piece 110, which is in contact with the N-pole of the stationary magnet 160, that is, the portion of the first pole piece 110, which is adjacent to the N-pole of the stationary magnet 160, is magnetized as the S-pole, and a portion of the first pole piece 110, which is relatively distant from the N-pole of the stationary magnet 160, that is, the portion of the first pole piece 110, which is adjacent to the rotary magnet 140, is magnetized as the N-pole.

A portion of the second pole piece 112, which is in contact with the S-pole of the stationary magnet 160, that is, the portion of the second pole piece 112, which is adjacent to the S-pole of the stationary magnet 160, is magnetized as the N-pole, and a portion of the second pole piece 112, which is relatively distant from the S-pole of the stationary magnet 160, that is, the portion of the second pole piece 112, which is adjacent to the third pole piece 130, is magnetized as the S-pole.

A portion of the third pole piece 130 connected to the second pole piece 112, that is, the portion of the third pole piece 130, which is adjacent to the second pole piece 112, is magnetized as the N-pole, and a portion of the third pole piece 130, which is relatively distant from the second pole piece 112, that is, the portion of the third pole piece 130, which is adjacent to the rotary magnet 140, is magnetized as the S-pole.

Therefore, the rotary magnet 140 is rotated and disposed at the first position at which the S-pole of the rotary magnet 140 is adjacent to the first pole piece 110 and magnetically connected to the first pole piece 110 and the N-pole of the rotary magnet 140 is adjacent to the third pole piece 130 and magnetically connected to the third pole piece 130.

When the rotary magnet 140 is rotated and disposed at the first position, one closed magnetic loop is formed along the first pole piece 110, the stationary magnet 160, the second pole piece 120, the third pole piece 130, and the rotary magnet 140, as indicated by the dotted line illustrated in FIG. 1A.

In the state in which the rotary magnet 140 is rotated and disposed at the first position, no magnetic flow is formed in the direction toward the first interaction surface 112 and the second interaction surface 122, and as a result, the holding object 1 cannot be held on the first interaction surface 112 and the second interaction surface 122.

Figure 1B:
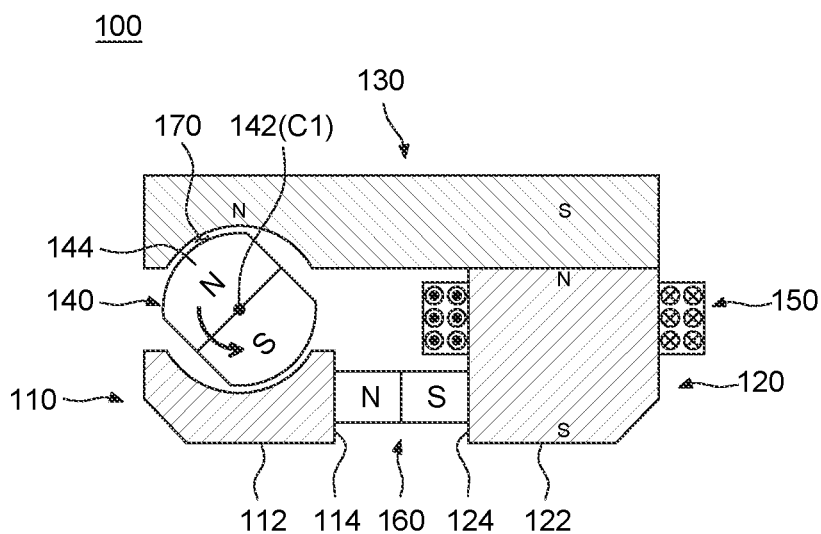

When the coil 150 is controlled so that the current flows through the coil 150 as illustrated in FIG. 1B, the S-pole is formed on the portion of the second pole piece 120 which is adjacent to the second interaction surface 122, and the N-pole is formed on the portion of the second pole piece 120 which is adjacent to the third pole piece 130.

In addition, the S-pole is formed on the portion of the third pole piece 130 which is connected to the second pole piece 112 and disposed adjacent to the second pole piece 112, and the N-pole is formed on the portion of the third pole piece 130 which is relatively distant from the second pole piece 112, that is, the portion of the third pole piece 130 which is adjacent to the rotary magnet 140.

When a sufficient current flows through the coil 150, the rotary magnet 140 receives repulsive force from the third pole piece 130, and the rotary magnet 140 is rotated.

Figure 1C:
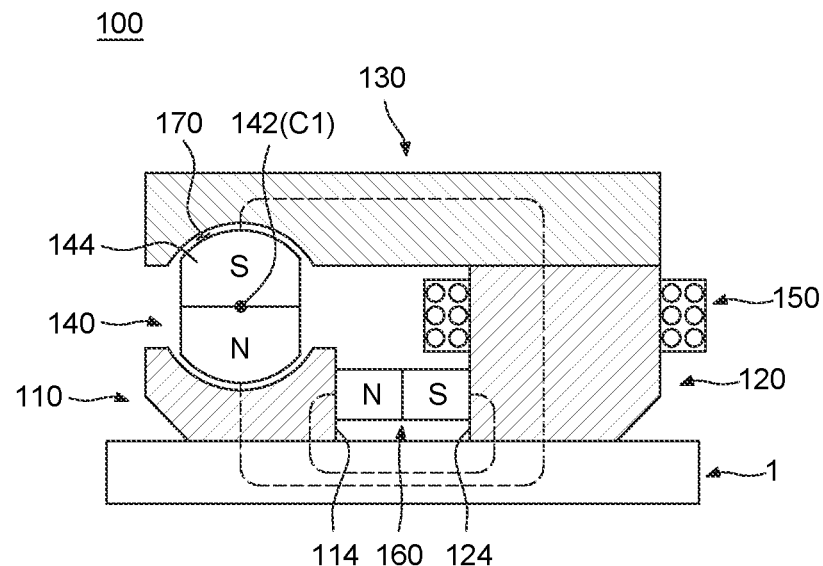

When the rotary magnet 140 is rotated by 180 degrees from the first position and disposed at the second position as illustrated in FIG. 1C, the N-pole of the rotary magnet 140 is adjacent to the first pole piece 110 and magnetically connected to the first pole piece 110, and the S-pole of the rotary magnet 140 is adjacent to the third pole piece 130 and magnetically connected to the third pole piece 130.

When the rotary magnet 140 is rotated and disposed at the second position, the magnetic flow is formed on the first interaction surface 112 and the second interaction surface 122, and the magnetic flow may form the closed magnetic loop together with another magnetic body. That is, the magnetic flow diverges through the first interaction surface 112 or the second interaction surface 122. In this case, the "divergence of the magnetic flow" includes both a case in which the magnetic flow is formed to the outside from the first interaction surface 112 or the second interaction surface 122 and a case in which the magnetic flow is formed from the outside to the first interaction surface 112 or the second interaction surface 122.

Therefore, when the object 1 having magnetism comes into contact with the first interaction surface 112 and the second interaction surface 122, the holding object 1 forms the closed magnetic loop, as illustrated in FIG. 1C, together with the rotary magnet 140, the first pole piece 110, the second pole piece 120, and the third pole piece 130, and the holding object 1 is held on the first interaction surface 112 and the second interaction surface 122 of the magnetic force control device 100.

In addition, because the stationary magnet 160 cannot form the magnetic flow together with the rotary magnet 140 in the state in which the rotary magnet 140 is disposed at the second position, the stationary magnet 160 forms another closed magnetic loop together with the holding object 1.

As described above, since the holding object 1 forms different closed magnetic loops together with the rotary magnet 140 and the stationary magnet 160, the holding object 1 may be stably held by the magnetic force control device 100.

When the closed magnetic loops are formed as illustrated in FIG. 1C, the closed magnetic loops are maintained even though the voltage applied to the coil 150 is eliminated, and as a result, the holding object 1 remains held.

Figure 1D:
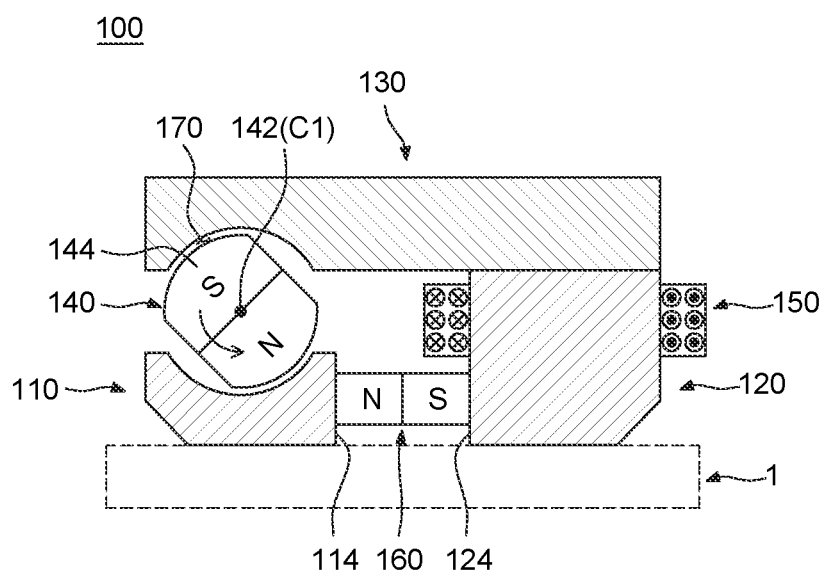

When the coil 150 is controlled in the state in which the rotary magnet 140 is disposed at the second position, as illustrated in FIG. 1D, so that the current flows in the direction opposite to the direction of the flow of the current illustrated in FIG. 1B, the rotary magnet 140 is rotated back to the first position and forms the closed magnetic loop together with the stationary magnet 160, as illustrated in FIG. 1A, such that the holding object 1 may be separated from the magnetic force control device 100.

FIGS. 2A to 2D are views schematically illustrating a magnetic force control device according to another exemplary embodiment of the present disclosure.

Referring to FIGS. 2A to 2D, a magnetic force control device 200 includes a first pole piece assembly 210, a second pole piece assembly 220, and a coil 230.

The first pole piece assembly 210 includes a first pole piece 211, a second pole piece 212, a third pole piece 213, a first rotary magnet 214, and a first stationary magnet 216.

The first pole piece 211 is made of a ferromagnetic material such as iron capable of forming a path through which magnetism may flow. The first pole piece 211 includes a first interaction surface 211a and a first support surface 211b.

The first interaction surface 211a is provided at one outer end of the first pole piece 211. When a magnetic flow is formed on the first interaction surface 211a, a holding object 1 having magnetism may be held on the first interaction surface 211a.

The first support surface 211b is provided at one side of the first pole piece 211. The first support surface 211b is in contact with one end of the first stationary magnet 216 to support the first stationary magnet 216. FIGS. 2A to 2D illustrate the structure in which the first support surface 211b is in contact with the N-pole of the first stationary magnet 216, but a structure in which the first support surface 211b is in contact with the S-pole of the first stationary magnet 216 may also be applied.

The second pole piece 212 is disposed to be spaced apart from the first pole piece 211 with the first stationary magnet 216 interposed therebetween.

The second pole piece 212 is made of a ferromagnetic material such as iron capable of forming a magnetic flow and includes a second interaction surface 212a and a second support surface 212b.

The second interaction surface 212a is provided at one outer end of the second pole piece 212. When a magnetic flow is formed on the second interaction surface 212a, the object 1 having magnetism may be held on the second interaction surface 212a. The second interaction surface 212a is disposed in parallel with the first interaction surface 211a in the horizontal direction so as to be stably in contact with the object 1.

When the magnetic flow is formed on the first interaction surface 211a and the second interaction surface 212a, the object 1 may come into contact with the first interaction surface 211a and the second interaction surface 212a. When the object 1 is in contact with the first interaction surface 211a and the second interaction surface 212a, the object 1 forms the magnetic flow together with the first interaction surface 211a and the second interaction surface 212a and is held by the magnetic force control device 100.

The second support surface 212b is provided at one side of the second pole piece 112. The second support surface 212b is disposed to face the first support surface 211b.

The second support surface 212b is in contact with the other end of the first stationary magnet 216 to support the first stationary magnet 216. FIGS. 2A to 2D illustrate the structure in which the second support surface 212b is in contact with the S-pole of the first stationary magnet 216, but a structure in which the second support surface 212b is in contact with the N-pole of the first stationary magnet 216 may also be applied.

The third pole piece 213 is connected to an upper end of the second pole piece 212 and disposed to be spaced apart from the first pole piece 211 with the first rotary magnet 214 interposed therebetween. The third pole piece 213 is disposed above the first pole piece 211 and the second pole piece 212.

The third pole piece 213 is made of a ferromagnetic material such as iron capable of forming a path through which magnetism may flow. The third pole piece 213 has a first receiving portion 210*a* that receives the first rotary magnet 214 together with the first pole piece 211. The first receiving portion 210*a* receives the first rotary magnet 214 and includes a rotation path P2 of the first rotary magnet 214.

The structure in which the third pole piece 213 is provided separately from the second pole piece 212 and connected to the upper end of the second pole piece 212 has been described above. However, the present disclosure is not limited thereto, and a structure in which the third pole piece 213 and the second pole piece 212 are integrally formed may also be applied. In this case, the second pole piece 212 and the third pole piece 213 may be formed into a single body, one end of the single body is disposed to be spaced apart from the first pole piece 211 with the first rotary magnet 214 interposed therebetween, and the other end of the single body is bent from the one end of the single body and disposed to be spaced apart from the first pole piece 211 with the first stationary magnet 216 interposed therebetween.

The first stationary magnet 216 is a permanent magnet, the N-pole of the first stationary magnet 216 is disposed to be in contact with the first pole piece 211, and the S-pole of the first stationary magnet 216 is disposed to be in contact with the second pole piece 212. The first stationary magnet 216 may be disposed to be closer to the first interaction surface 211*a* and the second interaction surface 212*a* than the first rotary magnet 214 and a rotation center C2 of the first rotary magnet 214.

The first rotary magnet 214 includes a permanent magnet 214*b* and a first rotary shaft 214*a* disposed rotatably. The permanent magnet 214*b* is disposed to be rotatable about the rotary shaft 214*a*.

The first rotary magnet 214 is disposed to be rotatable between a first position (see FIG. 2A) at which the S-pole of the first rotary magnet 214 is adjacent to the first pole piece 211 and magnetically connected to the first pole piece 211 and the N-pole of the first rotary magnet 214 is adjacent to the third pole piece 213 and magnetically connected to the third pole piece 213 and a second position (see FIG. 2C) at which the N-pole of the first rotary magnet 214 is adjacent to the first pole piece 211 and magnetically connected to the first pole piece 211 and the S-pole of the first rotary magnet 214 is adjacent to the third pole piece 213 and magnetically connected to the third pole piece 213.

The first rotary magnet 214 is disposed to be spaced apart from the first stationary magnet 216 even in the horizontal direction. Therefore, an overall height H2 of the magnetic force control device 200 may be reduced, the magnetic force control device 200 may be compact, and high holding force may be maintained.

The second pole piece assembly 220 is spaced apart from the first pole piece assembly 210 in the horizontal direction. A diamagnetic body 240 is disposed between the first pole piece assembly 210 and the second pole piece assembly 220 to prevent magnetic interference that may occur between the first pole piece assembly 210 and the second pole piece assembly 220.

The second pole piece assembly 220 and the first pole piece assembly 210 are symmetrically disposed with respect to the diamagnetic body 240.

The second pole piece assembly 220 includes a fourth pole piece 221, a fifth pole piece 222, a sixth pole piece 223, a second rotary magnet 224, and a second stationary magnet 226.

The fourth pole piece 221 is made of a ferromagnetic material such as iron capable of forming a path through which magnetism may flow. The fourth pole piece 221 includes a third interaction surface 221*a* and a third support surface 221*b*.

The third interaction surface 221*a* is provided at one outer end of the fourth pole piece 221. When a magnetic flow is formed on the third interaction surface 221*a*, the holding object 1 having magnetism may be held on the third interaction surface 221*a*.

The third support surface 221*b* is provided at one side of the fourth pole piece 221. The third support surface 221*b* is in contact with one end of the second stationary magnet 226 to support the second stationary magnet 226. FIGS. 2A to 2D illustrate the structure in which the third support surface 221*b* is in contact with the N-pole of the second stationary magnet 226, but a structure in which the third support surface 221*b* is in contact with the S-pole of the second stationary magnet 226 may also be applied.

The fifth pole piece 222 is disposed to be spaced apart from the fourth pole piece 221 with the second stationary magnet 226 interposed therebetween.

The fifth pole piece 222 is made of a ferromagnetic material such as iron capable of forming a magnetic flow and includes a fourth interaction surface 222*a* and a fourth support surface 222*b*.

The fourth interaction surface 222*a* is provided at one outer end of the fifth pole piece 222. When a magnetic flow is formed on the fourth interaction surface 222*a*, the object 1 having magnetism may be held on the fourth interaction surface 222*a*. The fourth interaction surface 222*a* is disposed in parallel with the third interaction surface 221*a* in the horizontal direction so as to be stably in contact with the object 1.

When the magnetic flow is formed on the third interaction surface 221*a* and the fourth interaction surface 222*a*, the object 1 may come into contact with the third interaction surface 221*a* and the fourth interaction surface 222*a*. When the object 1 is in contact with the third interaction surface 221*a* and the fourth interaction surface 222*a*, the object 1 forms the magnetic flow together with the third interaction surface 221*a* and the fourth interaction surface 222*a* and is held by the magnetic force control device 200.

The fourth support surface 222*b* is provided at one side of the fifth pole piece 222. The fourth support surface 222*b* is disposed to face the third support surface 221*b*.

The fourth support surface 222*b* is in contact with the other end of the second stationary magnet 226 to support the second stationary magnet 226. FIGS. 2A to 2D illustrate the structure in which the fourth support surface 222*b* is in contact with the S-pole of the second stationary magnet 226, but a structure in which the fourth support surface 222*b* is in contact with the N-pole of the second stationary magnet 226 may also be applied.

The sixth pole piece 223 is connected to an upper end of the fifth pole piece 222 and disposed to be spaced apart from the fourth pole piece 221 with the second rotary magnet 224 interposed therebetween. The sixth pole piece 223 is disposed above the fourth pole piece 221 and the fifth pole piece 222.

The sixth pole piece 223 is made of a ferromagnetic material such as iron capable of forming a path through which magnetism may flow. The sixth pole piece 223 has a second receiving portion 220a that receives the second rotary magnet 224 together with the fourth pole piece 221. The second receiving portion 220a receives the second rotary magnet 224 and includes a rotation path P3 of the second rotary magnet 224.

The structure in which the sixth pole piece 223 is provided separated from the fifth pole piece 222 and connected to the upper end of the fifth pole piece 222 has been described above. However, the present disclosure is not limited thereto, and a structure in which the sixth pole piece 223 and the fifth pole piece 222 are integrally formed may also be applied. In this case, the fifth pole piece 222 and the sixth pole piece 223 may be formed into a single body, one end of the single body is disposed to be spaced apart from the fourth pole piece 221 with the second rotary magnet 224 interposed therebetween, and the other end of the single body is bent from the one end of the single body and disposed to be spaced apart from the fourth pole piece 221 with the second stationary magnet 226 interposed therebetween.

The second stationary magnet 226 is a permanent magnet, the N-pole of the second stationary magnet 226 is disposed to be in contact with the fourth pole piece 221, and the S-pole of the second stationary magnet 226 is disposed to be in contact with the fifth pole piece 222. The second stationary magnet 226 may be disposed to be closer to the third interaction surface 221a and the fourth interaction surface 222a than a rotation center C3 of the second rotary magnet 224 and the second rotary magnet 224.

The second rotary magnet 224 includes a permanent magnet 224b and a rotary shaft 224a disposed rotatably. The permanent magnet 224b is disposed to be rotatable about the rotary shaft 224a.

The second rotary magnet 224 is disposed to be rotatable between a first position (see FIG. 2A) at which the S-pole of the second rotary magnet 224 is adjacent to the fourth pole piece 221 and magnetically connected to the fourth pole piece 221 and the N-pole of the second rotary magnet 224 is adjacent to the sixth pole piece 223 and magnetically connected to the sixth pole piece 223 and a second position (see FIG. 2C) at which the N-pole of the second rotary magnet 224 is adjacent to the fourth pole piece 221 and magnetically connected to the fourth pole piece 221 and the S-pole of the second rotary magnet 224 is adjacent to the sixth pole piece 223 and magnetically connected to the sixth pole piece 223.

The second rotary magnet 224 is disposed to be spaced apart from the second stationary magnet 226 even in the horizontal direction. Therefore, the overall height H2 of the magnetic force control device 200 may be reduced, the magnetic force control device 200 may be compact, and high holding force may be maintained.

The first interaction surface 211a, the second interaction surface 212a, the third interaction surface 221a, and the fourth interaction surface 222a may be disposed in parallel with one another in the horizontal direction. Therefore, the first interaction surface 211a, the second interaction surface 212a, the third interaction surface 221a, and the fourth interaction surface 222a may hold the single holding object 1.

The coil 230 is wound around the second pole piece 212 of the first pole piece assembly 210 and the fifth pole piece 222 of the second pole piece assembly 220.

The coil 230 is shared by the first pole piece assembly 210 and the second pole piece assembly 220, and it is possible to simultaneously control the magnetic force or the magnetic flow of the first pole piece assembly 210 and the second pole piece assembly 220 by controlling the current to be applied to the single coil 230.

FIGS. 2A to 2D illustrate the structure in which the coil 230 is wound around the second pole piece 212 and the fifth pole piece 222, but a structure in which an additional coil is wound around the third pole piece 213 or the sixth pole piece 223 may also be applied.

The coil 230 is disposed between the first rotary magnet 214 and the second rotary magnet 224.

The coil 230 is disposed on the magnetic flow between the first stationary magnet 216 and the first rotary magnet 214 and between the second stationary magnet 226 and the second rotary magnet 224.

When the current flows through the coil 230, the magnetic flow is formed in a predetermined direction by Ampere's right-handed screw rule, and the N-pole and the S-pole are formed in the direction of the magnetic flow on the second pole piece 212 and the fifth pole piece 222 around which the coil 230 is wound. That is, it can be seen that the coil 230 and the portions of the second pole piece 212 and the fifth pole piece 222 around which the coil 230 is wound serve as an electromagnet.

The diamagnetic body 240 is disposed between the second pole piece 212 and the fifth pole piece 222.

The diamagnetic body 240 has repulsive force against the magnetic field formed outside, and does not form the magnetic flow, or blocks the magnetic flow. Therefore, the diamagnetic body 240 prevents magnetic interference between the first pole piece assembly 210 and the second pole piece assembly 220.

Hereinafter, a principle of holding the holding object 1, which is a magnetic body, or releasing the holding object 1 will be described with reference to FIGS. 2A to 2D.

Figure 2A:
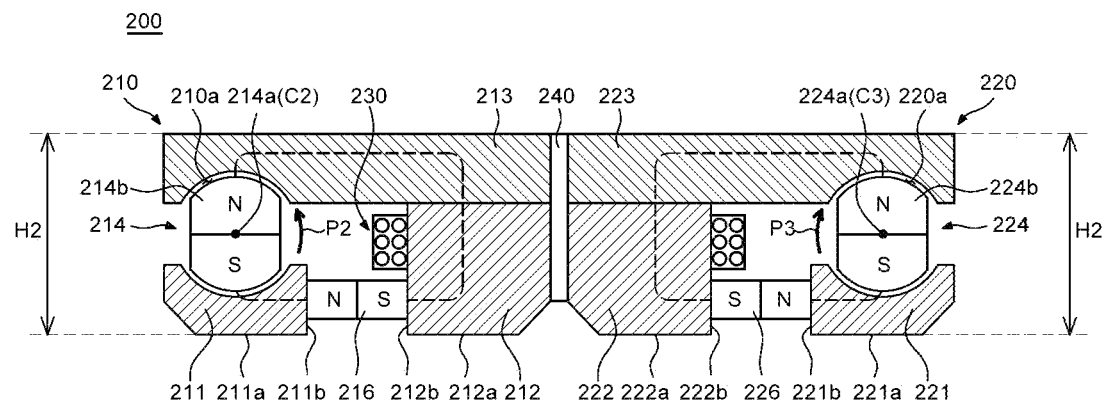
FIGS. 2A to 2D are views schematically illustrating a magnetic force control device according to another exemplary embodiment of the present disclosure.

First, referring to FIG. 2A, when no power is applied to the coil 230 and thus no current flows, a portion of the first pole piece 211, which is in contact with the N-pole of the first stationary magnet 216, that is, the portion of the first pole piece 211, which is adjacent to the N-pole of the first stationary magnet 216, is magnetized as the S-pole, and a portion of the first pole piece 211, which is relatively distant from the N-pole of the first stationary magnet 216, that is, the portion of the first pole piece 211, which is adjacent to the first rotary magnet 214, is magnetized as the N-pole.

A portion of the second pole piece 212, which is in contact with the S-pole of the first stationary magnet 216, that is, the portion of the second pole piece 212, which is adjacent to the S-pole of the first stationary magnet 216, is magnetized as the N-pole, and a portion of the second pole piece 212, which is relatively distant from the S-pole of the first stationary magnet 216, that is, the portion of the second pole piece 212, which is adjacent to the third pole piece 213, is magnetized as the S-pole.

A portion of the third pole piece 213 connected to the second pole piece 212, that is, the portion of the third pole piece 213, which is adjacent to the second pole piece 212, is magnetized as the N-pole, and a portion of the third pole piece 213, which is relatively distant from the second pole piece 212, that is, the portion of the third pole piece 213, which is adjacent to the first rotary magnet 214, is magnetized as the S-pole.

Therefore, the first rotary magnet 214 is rotated and disposed at the first position at which the S-pole of the first rotary magnet 214 is adjacent to the first pole piece 211 and magnetically connected to the first pole piece 211 and the N-pole of the first rotary magnet 214 is adjacent to the third pole piece 213 and magnetically connected to the third pole piece 213.

When the first rotary magnet 214 is rotated and disposed at the first position, one closed magnetic loop is formed along the first pole piece 211, the first stationary magnet 216, the second pole piece 212, the third pole piece 213, and the first rotary magnet 214, as indicated by the dotted line illustrated in FIG. 2A.

In the state in which the first rotary magnet 214 is rotated and disposed at the first position, no magnetic flow is formed in the direction toward the first interaction surface 211a and the second interaction surface 212a, and as a result, the holding object 1 cannot be held on the first interaction surface 211a and the second interaction surface 212a.

In addition, when no power is applied to the coil 230 and thus no current flows, a portion of the fourth pole piece 221, which is in contact with the N-pole of the second stationary magnet 226, that is, the portion of the fourth pole piece 221, which is adjacent to the N-pole of the second stationary magnet 226, is magnetized as the S-pole, and a portion of the fourth pole piece 221, which is relatively distant from the N-pole of the second stationary magnet 226, that is, the portion of the fourth pole piece 221, which is adjacent to the second rotary magnet 224, is magnetized as the N-pole.

A portion of the fifth pole piece 222, which is in contact with the S-pole of the second stationary magnet 226, that is, the portion of the fifth pole piece 222, which is adjacent to the S-pole of the second stationary magnet 226, is magnetized as the N-pole, and a portion of the fifth pole piece 222, which is relatively distant from the S-pole of the second stationary magnet 226, that is, the portion of the fifth pole piece 222, which is adjacent to the sixth pole piece 223, is magnetized as the S-pole.

A portion of the sixth pole piece 223 connected to the fifth pole piece 222, that is, the portion of the sixth pole piece 223, which is adjacent to the fifth pole piece 222, is magnetized as the N-pole, and a portion of the sixth pole piece 223, which is relatively distant from the fifth pole piece 222, that is, the portion of the sixth pole piece 223, which is adjacent to the second rotary magnet 224, is magnetized as the S-pole.

Therefore, the second rotary magnet 224 is rotated and disposed at the first position at which the S-pole of the second rotary magnet 224 is adjacent to the fourth pole piece 221 and magnetically connected to the fourth pole piece 221 and the N-pole of the second rotary magnet 224 is adjacent to the sixth pole piece 223 and magnetically connected to the sixth pole piece 223.

When the second rotary magnet 224 is rotated and disposed at the first position, one closed magnetic loop is formed along the fourth pole piece 221, the second stationary magnet 226, the fifth pole piece 222, the sixth pole piece 223, and the second rotary magnet 224, as indicated by the dotted line illustrated in FIG. 2A.

In the state in which the second rotary magnet 224 is rotated and disposed at the first position, no magnetic flow is formed in the direction toward the third interaction surface 221a and the fourth interaction surface 222a, and as a result, the holding object 1 cannot be held on the third interaction surface 221a and the fourth interaction surface 222a.

Figure 2B:
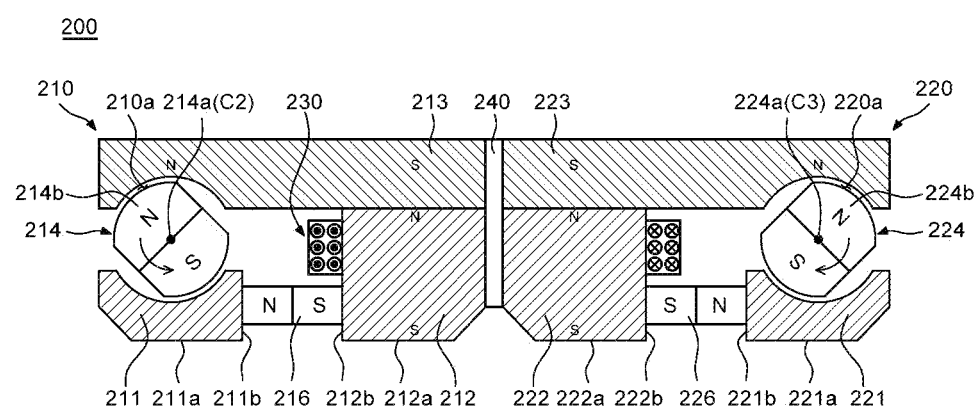

When the coil 230 is controlled so that the current flows through the coil 230 as illustrated in FIG. 2B, the S-pole is formed on the portion of the second pole piece 212 which is adjacent to the second interaction surface 212a, and the N-pole is formed on the portion of the second pole piece 212 which is adjacent to the third pole piece 213.

In addition, the S-pole is formed on the portion of the third pole piece 213 which is connected to the second pole piece 212 and disposed adjacent to the second pole piece 212, and the N-pole is formed on the portion of the third pole piece 213, which is relatively distant from the second pole piece 212, that is, the portion of the third pole piece 213 which is adjacent to the first rotary magnet 214.

When a sufficient current flows through the coil 230, the first rotary magnet 214 receives repulsive force from the third pole piece 213, and the first rotary magnet 214 is rotated.

Figure 2C:
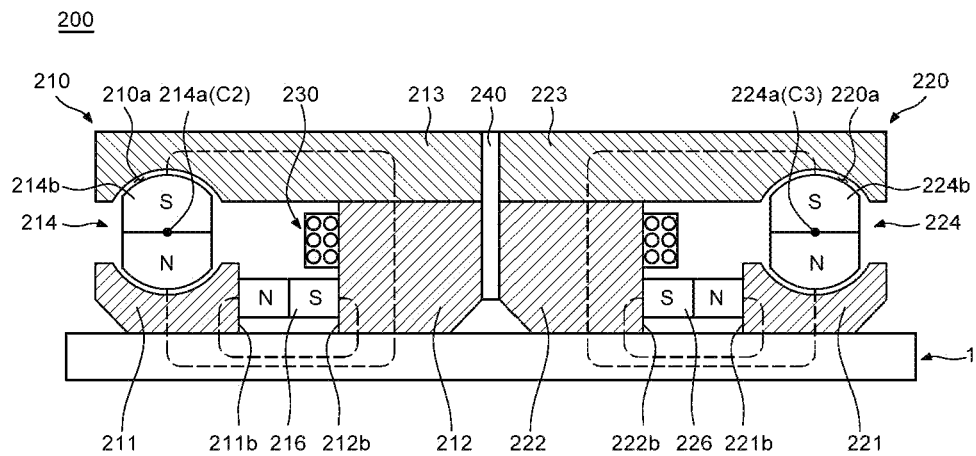

When the first rotary magnet 214 is rotated by 180 degrees from the first position and disposed at the second position as illustrated in FIG. 2C, the N-pole of the first rotary magnet 214 is adjacent to the first pole piece 211 and magnetically connected to the first pole piece 211, and the S-pole of the first rotary magnet 214 is adjacent to the third pole piece 213 and magnetically connected to the third pole piece 213.

When the first rotary magnet 214 is rotated and disposed at the second position, the magnetic flow is formed on the first interaction surface 211a and the second interaction surface 212a, and the magnetic flow may form the closed magnetic loop together with another magnetic body. That is, the magnetic flow diverges through the first interaction surface 211a or the second interaction surface 212a. In this case, "divergence of the magnetic flow" includes both a case in which the magnetic flow is formed to the outside from the first interaction surface 211a or the second interaction surface 212a and a case in which the magnetic flow is formed from the outside to the first interaction surface 211a or the second interaction surface 212a.

Therefore, when the holding object 1 having magnetism comes into contact with the first interaction surface 211a and the second interaction surface 212a, the holding object 1 forms the closed magnetic loop, as illustrated in FIG. 2C, together with the first rotary magnet 214, the first pole piece 211, the second pole piece 212, and the third pole piece 213, and the holding object 1 is held on the first interaction surface 211a and the second interaction surface 212a of the magnetic force control device 200.

In addition, because the first stationary magnet 216 cannot form the magnetic flow together with the first rotary magnet 214 in the state in which the first rotary magnet 214 is disposed at the second position, the first stationary magnet 216 forms another closed magnetic loop together with the holding object 1.

As described above, since the holding object 1 forms different closed magnetic loops together with the first rotary magnet 214 and the first stationary magnet 216, the holding object 1 may be stably held by the magnetic force control device 200.

In addition, when the coil 230 is controlled so that the current flows through the coil 230 as illustrated in FIG. 2B, the S-pole is formed on the portion of the fifth pole piece 222 which is adjacent to the second interaction surface 222a, and the N-pole is formed on the portion of the fifth pole piece 222 which is adjacent to the sixth pole piece 223.

In addition, the S-pole is formed on the portion of the sixth pole piece 223 which is connected to the fifth pole piece 222 and disposed adjacent to the fifth pole piece 222, and the N-pole is formed on the portion of the sixth pole piece 223 which is relatively distant from the fifth pole piece 222, that is, the portion of the sixth pole piece 223 which is adjacent to the second rotary magnet 224.

When a sufficient current flows through the coil 230, the second rotary magnet 224 receives repulsive force from the sixth pole piece 223, and the second rotary magnet 224 is rotated.

When the second rotary magnet 224 is rotated by 180 degrees from the first position and disposed at the second position as illustrated in FIG. 2C, the N-pole of the second rotary magnet 224 is adjacent to the fourth pole piece 221 and magnetically connected to the fourth pole piece 221, and the S-pole of the second rotary magnet 224 is adjacent to the sixth pole piece 223 and magnetically connected to the sixth pole piece 223.

When the second rotary magnet 224 is rotated and disposed at the second position, the magnetic flow is formed on the third interaction surface 221a and the fourth interaction surface 222a, and the magnetic flow may form the closed magnetic loop together with another magnetic body. That is, the magnetic flow diverges through the third interaction surface 221a or the fourth interaction surface 222a. In this case, "divergence of the magnetic flow" includes both a case in which the magnetic flow is formed to the outside from the third interaction surface 221a or the fourth interaction surface 222a and a case in which the magnetic flow is formed from the outside to the third interaction surface 221a or the fourth interaction surface 222a.

Therefore, when the holding object 1 having magnetism comes into contact with the third interaction surface 221a and the fourth interaction surface 222a, the holding object 1 forms the closed magnetic loop, as illustrated in FIG. 2C, together with the second rotary magnet 224, the fourth pole piece 221, the fifth pole piece 222, and the sixth pole piece 223, and the holding object 1 is held on the third interaction surface 221a and the fourth interaction surface 222a of the magnetic force control device 200.

In addition, because the second stationary magnet 226 cannot form the magnetic flow together with the second rotary magnet 224 in the state in which the second rotary magnet 224 is disposed at the second position, the second stationary magnet 226 forms another closed magnetic loop together with the holding object 1.

As described above, since the holding object 1 forms different closed magnetic loops together with the second rotary magnet 224 and the second stationary magnet 226, the holding object 1 may be stably held by the magnetic force control device 200.

As described above, the first interaction surface 211a, the second interaction surface 212a, the third interaction surface 221a, and the fourth interaction surface 222a may be disposed in parallel with one another in the horizontal direction. Therefore, the magnetic flow simultaneously diverges through the first interaction surface 211a, the second interaction surface 212a, the third interaction surface 221a, and the fourth interaction surface 222a in the state in which each of the first rotary magnet 214 and the second rotary magnet 224 is disposed at the second position, and the first interaction surface 211a, the second interaction surface 212a, the third interaction surface 221a, and the fourth interaction surface 222a may hold the single holding object 1.

When the closed magnetic loops are formed as illustrated in FIG. 2C, the closed magnetic loops are maintained even though the voltage applied to the coil 230 is eliminated, and as a result, the holding object 1 remains held.

Figure 2D:
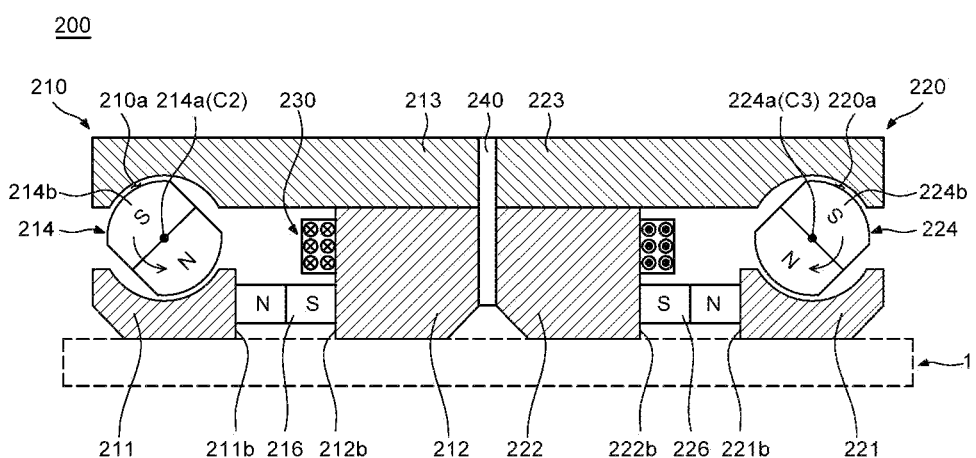

When the coil 230 is controlled, as illustrated in FIG. 2D, in the state in which the first rotary magnet 214 and the second rotary magnet 224 are disposed at the second position, so that the current flows in the direction opposite to the direction of the flow of the current illustrated in FIG. 2B, the first rotary magnet 214 and the second rotary magnet 224 are rotated back to the first position, as illustrated in FIG. 2A.

Therefore, the first rotary magnet 214 forms the closed magnetic loop together with the first stationary magnet 216, and the second rotary magnet 224 forms the closed magnetic loop together with the second stationary magnet 226, such that the holding object 1 may be separated from the magnetic force control device 200.

FIGS. 3A to 3D are views schematically illustrating a magnetic force control device according to still another exemplary embodiment of the present disclosure.

A magnetic force control device 300 illustrated in FIGS. 3A to 3D is an exemplary embodiment in which the arrangement positions of the first pole piece assembly 210 and the second pole piece assembly 220 of the magnetic force control device 200 illustrated in FIGS. 2A to 2D are changed and the structure in which the coil 230 is wound is changed.

That is, in the magnetic force control device 300 illustrated in FIGS. 3A to 3D, the first pole piece assembly 210 and the second pole piece assembly 220 are disposed in an up-down direction, i.e., the vertical direction, and the diamagnetic body 240 is disposed between the third pole piece 213 of the first pole piece assembly 210 and the sixth pole piece 223 of the second pole piece assembly 220.

The first interaction surface 211a and the second interaction surface 212a are disposed to be directed toward the lower side based on the drawings, and the third interaction surface 221a and the fourth interaction surface 222a are disposed to be directed toward the upper side based on the drawings. That is, the direction toward which the first interaction surface 211a and the second interaction surface 212a are directed is opposite to the direction toward which the third interaction surface 221a and the fourth interaction surface 222a are directed. Therefore, the first and second interaction surfaces 211a and 212a and the third and fourth interaction surfaces 221a and 222a hold different holding objects 1 and 2.

The coil 230 is configured to be wound around the third pole piece 213 and the sixth pole piece 223 and disposed between the first stationary magnet 216 and the second stationary magnet 226.

In addition, the constituent elements included in the magnetic force control device 300 illustrated in FIGS. 3A to 3D are identical to the constituent elements included in the magnetic force control device 200 illustrated in FIGS. 2A to 2D, and as a result, the same constituent elements are denoted by the same reference numerals, and specific descriptions thereof will be omitted.

Hereinafter, a principle of holding or releasing the holding objects 1 and 2, which are the magnetic bodies, will be described with reference to FIGS. 3A to 3D.

Figure 3A:
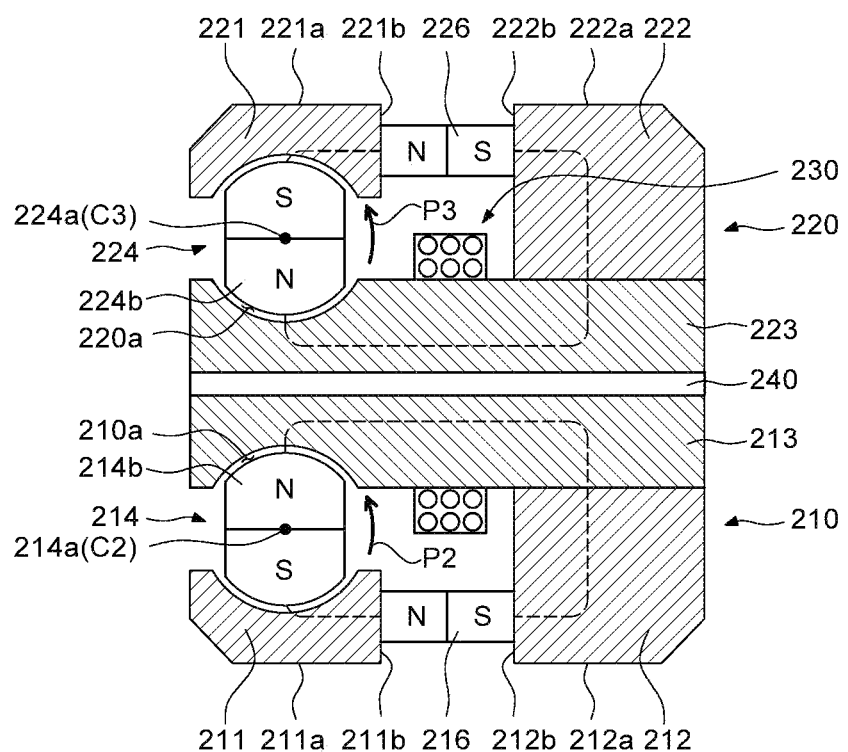
FIGS. 3A to 3D are views schematically illustrating a magnetic force control device according to still another exemplary embodiment of the present disclosure.

First, referring to FIG. 3A, when no power is applied to the coil 230 and thus no current flows, a portion of the first pole piece 211, which is in contact with the N-pole of the first stationary magnet 216, that is, the portion of the first pole piece 211, which is adjacent to the N-pole of the first stationary magnet 216, is magnetized as the S-pole, and a portion of the first pole piece 211, which is relatively distant from the N-pole of the first stationary magnet 216, that is, the portion of the first pole piece 211, which is adjacent to the first rotary magnet 214, is magnetized as the N-pole.

A portion of the second pole piece 212, which is in contact with the S-pole of the first stationary magnet 216, that is, the portion of the second pole piece 212, which is adjacent to the S-pole of the first stationary magnet 216, is magnetized as the N-pole, and a portion of the second pole piece 212, which is relatively distant from the S-pole of the first stationary magnet 216, that is, the portion of the second pole piece 212, which is adjacent to the third pole piece 213, is magnetized as the S-pole.

A portion of the third pole piece 213 connected to the second pole piece 212, that is, the portion of the third pole piece 213, which is adjacent to the second pole piece 212, is magnetized as the N-pole, and a portion of the third pole piece 213, which is relatively distant from the second pole piece 212, that is, the portion of the third pole piece 213, which is adjacent to the first rotary magnet 214, is magnetized as the S-pole.

Therefore, the first rotary magnet 214 is rotated and disposed at the first position at which the S-pole of the first rotary magnet 214 is adjacent to the first pole piece 211 and magnetically connected to the first pole piece 211 and the N-pole of the first rotary magnet 214 is adjacent to the third pole piece 213 and magnetically connected to the third pole piece 213.

When the first rotary magnet 214 is rotated and disposed at the first position, one closed magnetic loop is formed along the first pole piece 211, the first stationary magnet 216, the second pole piece 212, the third pole piece 213, and the first rotary magnet 214, as indicated by the dotted line illustrated in FIG. 2A.

In the state in which the first rotary magnet 214 is rotated and disposed at the first position, no magnetic flow is formed in the direction toward the first interaction surface 211a and the second interaction surface 212a, and as a result, the holding object 1 cannot be held on the first interaction surface 211a and the second interaction surface 212a.

In addition, when no power is applied to the coil 230 and thus no current flows, a portion of the fourth pole piece 221, which is in contact with the N-pole of the second stationary magnet 226, that is, the portion of the fourth pole piece 221, which is adjacent to the N-pole of the second stationary magnet 226, is magnetized as the S-pole, and a portion of the fourth pole piece 221, which is relatively distant from the N-pole of the second stationary magnet 226, that is, the portion of the fourth pole piece 221, which is adjacent to the second rotary magnet 224, is magnetized as the N-pole.

A portion of the fifth pole piece 222, which is in contact with the S-pole of the second stationary magnet 226, that is, the portion of the fifth pole piece 222, which is adjacent to the S-pole of the second stationary magnet 226, is magnetized as the N-pole, and a portion of the fifth pole piece 222, which is relatively distant from the S-pole of the second stationary magnet 226, that is, the portion of the fifth pole piece 222, which is adjacent to the sixth pole piece 223, is magnetized as the S-pole.

A portion of the sixth pole piece 223 connected to the fifth pole piece 222, that is, the portion of the sixth pole piece 223, which is adjacent to the fifth pole piece 222, is magnetized as the N-pole, and a portion of the sixth pole piece 223, which is relatively distant from the fifth pole piece 222, that is, the portion of the sixth pole piece 223, which is adjacent to the second rotary magnet 224, is magnetized as the S-pole.

Therefore, the second rotary magnet 224 is rotated and disposed at the first position at which the S-pole of the second rotary magnet 224 is adjacent to the fourth pole piece 221 and magnetically connected to the fourth pole piece 221 and the N-pole of the second rotary magnet 224 is adjacent to the sixth pole piece 223 and magnetically connected to the sixth pole piece 223.

When the second rotary magnet 224 is rotated and disposed at the first position, one closed magnetic loop is formed along the fourth pole piece 221, the second stationary magnet 226, the fifth pole piece 222, the sixth pole piece 223, and the second rotary magnet 224, as indicated by the dotted line illustrated in FIG. 2A.

In the state in which the second rotary magnet 224 is rotated and disposed at the first position, no magnetic flow is formed in the direction toward the third interaction surface 221a and the fourth interaction surface 222a, and as a result, the holding object 2 cannot be held on the third interaction surface 221a and the fourth interaction surface 222a.

Figure 3B:
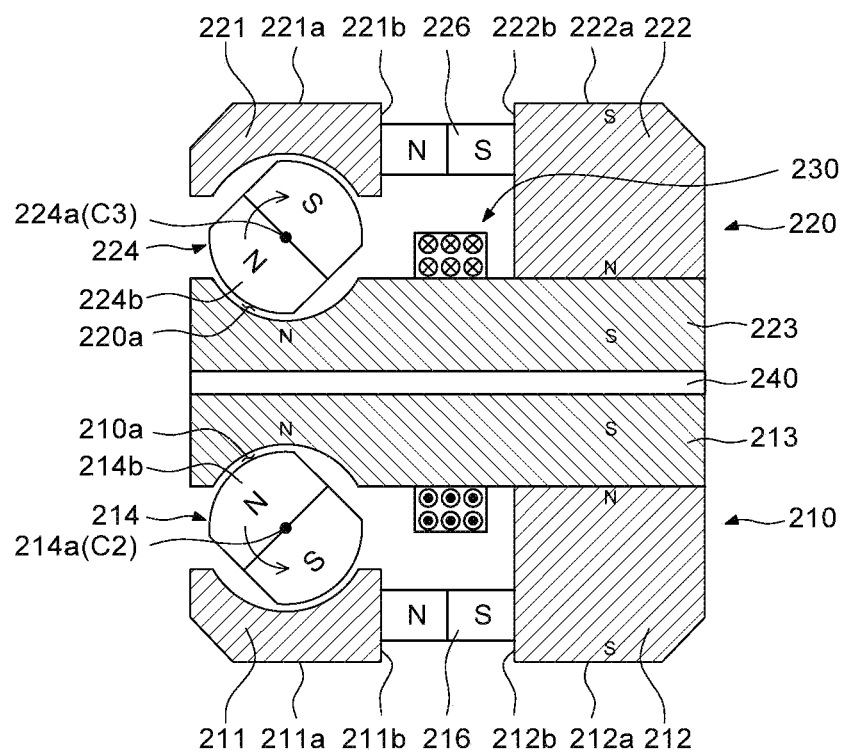

When the coil 230 is controlled so that the current flows through the coil 230 as illustrated in FIG. 3B, the S-pole is formed on the portion of the second pole piece 212 which is adjacent to the second interaction surface 212a, and the N-pole is formed on the portion of the second pole piece 212 which is adjacent to the third pole piece 213.

In addition, the S-pole is formed on the portion of the third pole piece 213 which is connected to the second pole piece 212 and disposed adjacent to the second pole piece 212, and the N-pole is formed on the portion of the third pole piece 213, which is relatively distant from the second pole piece 212, that is, the portion of the third pole piece 213 which is adjacent to the first rotary magnet 214.

When a sufficient current flows through the coil 230, the first rotary magnet 214 receives repulsive force from the third pole piece 213, and the first rotary magnet 214 is rotated.

Figure 3C:
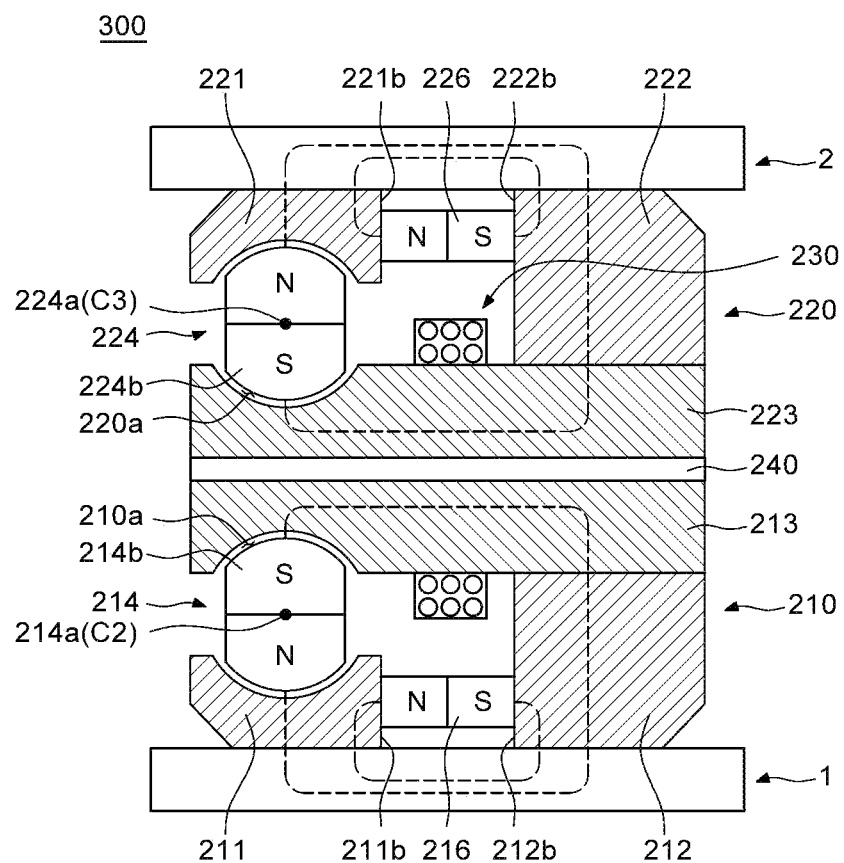

When the first rotary magnet 214 is rotated by 180 degrees from the first position and disposed at the second position as illustrated in FIG. 3C, the N-pole of the first rotary magnet 214 is adjacent to the first pole piece 211 and magnetically connected to the first pole piece 211, and the S-pole of the first rotary magnet 214 is adjacent to the third pole piece 213 and magnetically connected to the third pole piece 213.

When the first rotary magnet 214 is rotated and disposed at the second position, the magnetic flow is formed on the first interaction surface 211a and the second interaction surface 212a, and the magnetic flow may form the closed magnetic loop together with another magnetic body. That is, the magnetic flow diverges through the first interaction surface 211a or the second interaction surface 212a. In this case, "divergence of the magnetic flow" includes both a case in which the magnetic flow is formed to the outside from the first interaction surface 211a or the second interaction surface 212a and a case in which the magnetic flow is formed from the outside to the first interaction surface 211a or the second interaction surface 212a.

Therefore, when the holding object 1 having magnetism comes into contact with the first interaction surface 211a and the second interaction surface 212a, the holding object 1 forms the closed magnetic loop, as illustrated in FIG. 3C, together with the first rotary magnet 214, the first pole piece 211, the second pole piece 212, and the third pole piece 213, and the holding object 1 is held on the first interaction surface 211a and the second interaction surface 212a of the magnetic force control device 300.

In addition, because the first stationary magnet 216 cannot form the magnetic flow together with the first rotary magnet 214 in the state in which the first rotary magnet 214 is disposed at the second position, the first stationary magnet 216 forms another closed magnetic loop together with the holding object 1.

As described above, since the holding object 1 forms different closed magnetic loops together with the first rotary magnet 214 and the first stationary magnet 216, the holding object 1 may be stably held by the magnetic force control device 200.

In addition, when the coil 230 is controlled so that the current flows through the coil 230 as illustrated in FIG. 3B, the S-pole is formed on the portion of the fifth pole piece 222 which is adjacent to the second interaction surface 222a, and the N-pole is formed on the portion of the fifth pole piece 222 which is adjacent to the sixth pole piece 223.

In addition, the S-pole is formed on the portion of the sixth pole piece 223 which is connected to the fifth pole piece 222 and disposed adjacent to the fifth pole piece 222, and the N-pole is formed on the portion of the sixth pole piece 223 which is relatively distant from the fifth pole piece 222, that is, the portion of the sixth pole piece 223 which is adjacent to the second rotary magnet 224.

When a sufficient current flows through the coil 230, the second rotary magnet 224 receives repulsive force from the sixth pole piece 223, and the second rotary magnet 224 is rotated.

When the second rotary magnet 224 is rotated by 180 degrees from the first position and disposed at the second position as illustrated in FIG. 3C, the N-pole of the second rotary magnet 224 is adjacent to the fourth pole piece 221 and magnetically connected to the fourth pole piece 221, and the S-pole of the second rotary magnet 224 is adjacent to the sixth pole piece 223 and magnetically connected to the sixth pole piece 223.

When the second rotary magnet 224 is rotated and disposed at the second position, the magnetic flow is formed on the third interaction surface 221a and the fourth interaction surface 222a, and the magnetic flow may form the closed magnetic loop together with another magnetic body. That is, the magnetic flow diverges through the third interaction surface 221a or the fourth interaction surface 222a. In this case, "divergence of the magnetic flow" includes both a case in which the magnetic flow is formed to the outside from the third interaction surface 221a or the fourth interaction surface 222a and a case in which the magnetic flow is formed from the outside to the third interaction surface 221a or the fourth interaction surface 222a.

Therefore, when the holding object 2 having magnetism comes into contact with the third interaction surface 221a and the fourth interaction surface 222a, the holding object 2 forms the closed magnetic loop, as illustrated in FIG. 3C, together with the second rotary magnet 224, the fourth pole piece 221, the fifth pole piece 222, and the sixth pole piece 223, and the holding object 2 is held on the third interaction surface 221a and the fourth interaction surface 222a of the magnetic force control device 300.

In addition, because the second stationary magnet 226 cannot form the magnetic flow together with the second rotary magnet 224 in the state in which the second rotary magnet 224 is disposed at the second position, the second stationary magnet 226 forms another closed magnetic loop together with the holding object 2.

As described above, since the holding object 2 forms different closed magnetic loops together with the second rotary magnet 224 and the second stationary magnet 226, the holding object 2 may be stably held by the magnetic force control device 300.

As described above, the first and second interaction surfaces 211a and 212a and the third and fourth interaction surfaces 221a and 222a may be disposed in the up-down direction, i.e., the vertical direction. Therefore, the magnetic flow simultaneously diverges through the first interaction surface 211a, the second interaction surface 212a, the third interaction surface 221a, and the fourth interaction surface 222a in the state in which each of the first rotary magnet 214 and the second rotary magnet 224 is disposed at the second position, and the first and second interaction surfaces 211a and 212a and the third and fourth interaction surfaces 221a and 222a hold the different holding objects 1 and 2, respectively.

When the closed magnetic loops are formed as illustrated in FIG. 3C, the closed magnetic loops are maintained even though the voltage applied to the coil 230 is eliminated, and as a result, the holding objects 1 and 2 remain held.

Figure 3D:
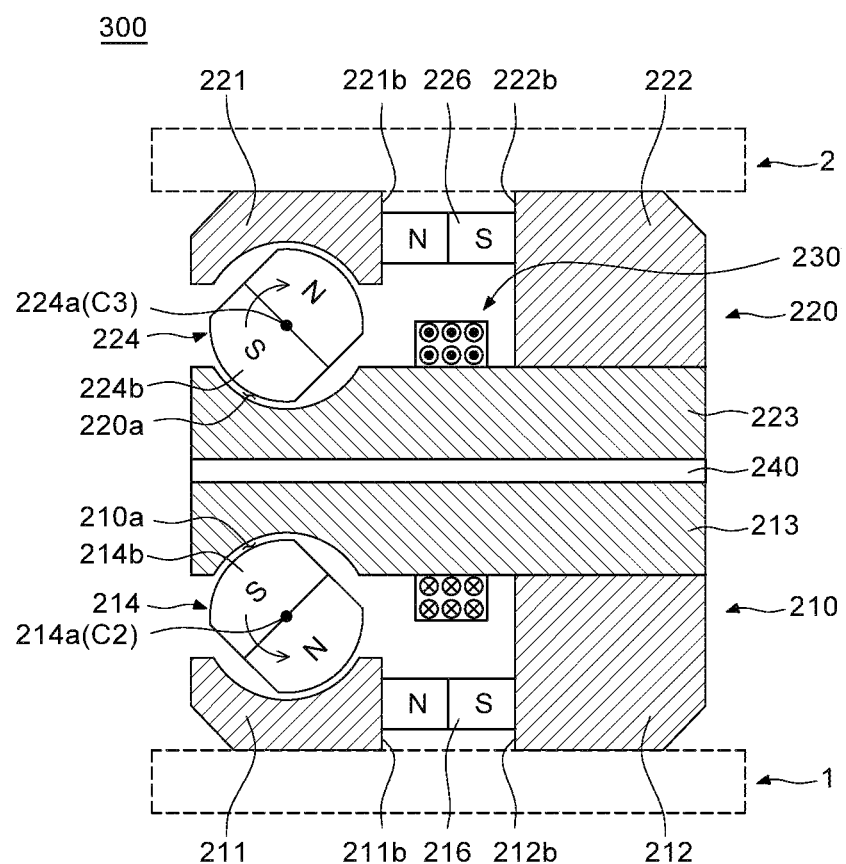

When the coil 230 is controlled, as illustrated in FIG. 3D, in the state in which the first rotary magnet 214 and the second rotary magnet 224 are disposed at the second position, so that the current flows in the direction opposite to the direction of the flow of the current illustrated in FIG. 3B, the first rotary magnet 214 and the second rotary magnet 224 are rotated back to the first position, as illustrated in FIG. 3A.

Therefore, the first rotary magnet 214 forms the closed magnetic loop together with the first stationary magnet 216, and the second rotary magnet 224 forms the closed magnetic loop together with the second stationary magnet 226, such that the holding objects 1 and 2 may be separated from the magnetic force control device 300.

FIGS. 3A to 3D illustrate the structure in which the first pole piece assembly 210 and the second pole piece assembly 220 of the magnetic force control device 300 simultaneously hold or release the holding objects 1 and 2.

However, a structure in which the first pole piece assembly 210 holds the holding object 1 and, at the same time, the second pole piece assembly 220 releases the holding object 2 may also be applied, and a state in which the first pole piece assembly 210 releases the holding object 1 and, at the same time, the second pole piece assembly 220 holds the holding object 2 may also be applied.

For example, the above-mentioned structure may be implemented by switching the polarity arrangement of the first stationary magnet 216 of the first pole piece assembly 210 of the magnetic force control device 300 from the current N→S or S→N or by switching the polarity arrangement of the second stationary magnet 226 of the second pole piece assembly 220 from the current N→S or S→N.

Hereinafter, a magnetic force control device 400 according to yet another exemplary embodiment of the present disclosure will be described. A description of parts identical to the above-mentioned parts of the magnetic force control device 200 according to another exemplary embodiment of the present disclosure will be omitted, and only parts different from the above-mentioned parts of the magnetic force control device 400 will be described.

Figure 4:
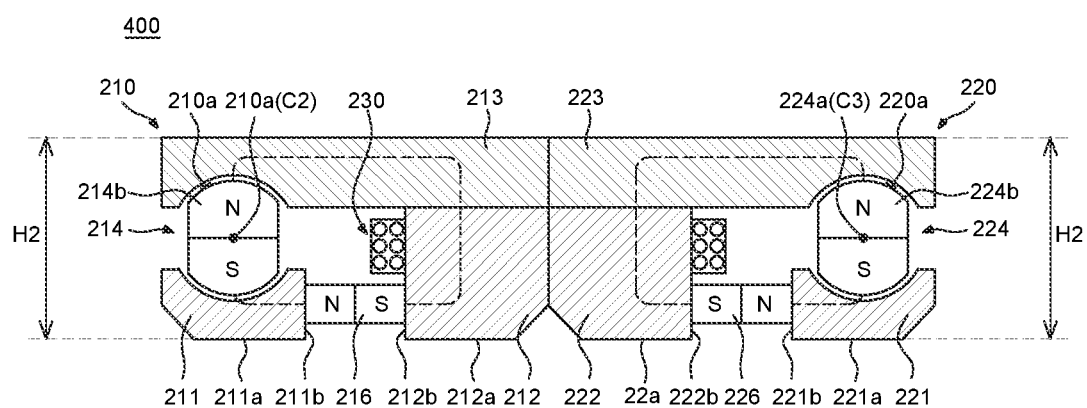
FIG. 4 is a view schematically illustrating a magnetic force control device according to yet another exemplary embodiment of the present disclosure.

FIG. 4 is a view schematically illustrating the magnetic force control device according to yet another exemplary embodiment of the present disclosure.

Referring to FIG. 4, the magnetic force control device 400 has a structure in which the diamagnetic body 240 is omitted from the above-mentioned magnetic force control device 200 according to another exemplary embodiment of the present disclosure.

Therefore, the magnetic force control device 400 has a structure in which the third pole piece 213 and the sixth pole piece 223 are coupled to each other and the second pole piece 212 and the fifth pole piece 222 are coupled to each other.

FIG. 4 illustrates the structure in which the second pole piece 212, the third pole piece 213, the fifth pole piece 222, and the sixth pole piece 223 of the magnetic force control device 400 are coupled to one another, but the present disclosure is not limited thereto.

For example, all the second pole piece 212, the third pole piece 213, the fifth pole piece 222, and the sixth pole piece 223 may be integrally formed. Alternatively, the second pole piece 212 and the third pole piece 213 may be integrally formed, and the fifth pole piece 222 and the sixth pole piece 223 may be integrally formed. In addition, the second pole piece 212 and the fifth pole piece 222 may be integrally formed, and the third pole piece 213 and the sixth pole piece 223 may be integrally formed.

Hereinafter, a magnetic force control device 500 according to still yet another exemplary embodiment of the present disclosure will be described. A description of parts identical to the above-mentioned parts of the magnetic force control device 300 according to still another exemplary embodiment of the present disclosure will be omitted, and only parts different from the above-mentioned parts of the magnetic force control device 500 will be described.

Figure 5:
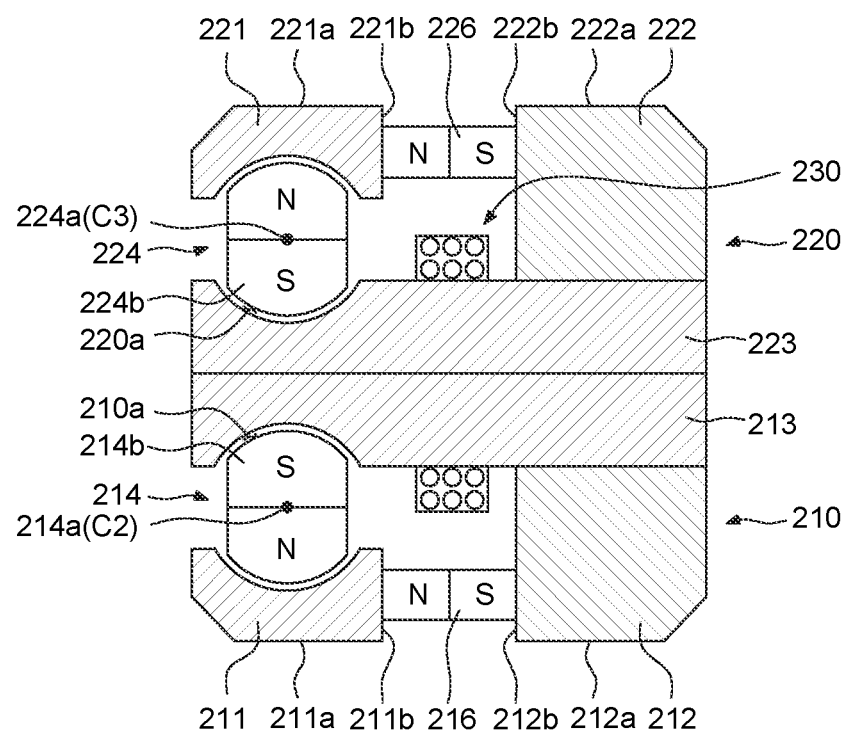
FIG. 5 is a view schematically illustrating a magnetic force control device according to still yet another exemplary embodiment of the present disclosure.

FIG. 5 is a view schematically illustrating the magnetic force control device according to still yet another exemplary embodiment of the present disclosure.

The magnetic force control device 500 illustrated in FIG. 5 has a structure in which the diamagnetic body 240 is omitted from the magnetic force control device 400 illustrated in FIGS. 3A to 3D. Therefore, the magnetic force control device 500 has the structure in which the third pole piece 213 and the sixth pole piece 223 are coupled to each other.

FIG. 5 illustrates the structure in which the third pole piece 213 and the sixth pole piece 223 of the magnetic force control device 500 are coupled to each other, but the present disclosure is not limited thereto.

For example, all the second pole piece 212, the third pole piece 213, the fifth pole piece 222, and the sixth pole piece 223 may be integrally formed. Alternatively, the second pole piece 212 and the third pole piece 213 may be integrally formed, and the fifth pole piece 222 and the sixth pole piece 223 may be integrally formed. In addition, the third pole piece 213 and the sixth pole piece 223 may be integrally formed.

While the exemplary embodiments of the present disclosure have been illustrated and described above, the present disclosure is not limited to the specific exemplary embodiments, and various modifications can of course be made by those skilled in the art to which the present disclosure pertains without departing from the subject matter of the present disclosure as claimed in the claims. Further, the modifications should not be appreciated individually from the technical spirit or prospect of the present disclosure.

What is claimed is:

1. A magnetic force control device comprising:
a first pole piece having a first interaction surface;
a second pole piece having a second interaction surface and extending from the second interaction surface in a holding direction of a holding object;
a third pole piece connected to the second pole piece;
a coil wound around at least one of the second pole piece and the third pole piece;
a stationary magnet fixed between the first pole piece and the second pole piece; and
a rotary magnet disposed between the first pole piece and the third pole piece and configured to be rotatable by controlling a current flowing through the coil,
wherein the third pole piece extends in a horizontal direction orthogonal to the holding direction and is configured to receive the rotary magnet together with the first pole piece, and
wherein, as the rotary magnet rotates, the rotary magnet and the stationary magnet form a closed magnetic loop or form a magnetic flow that diverges through the first interaction surface and the second interaction surface.

2. The magnetic force control device of claim 1, wherein the second pole piece and the third pole piece are integrally formed.

3. The magnetic force control device of claim 1, wherein the coil is disposed between the stationary magnet and the third pole piece.

4. The magnetic force control device of claim 1, wherein the stationary magnet is disposed to be closer to the second interaction surface than the coil.

5. The magnetic force control device of claim 1, wherein the stationary magnet is disposed to be closer to the first interaction surface than a rotation center (C1) of the rotary magnet.

6. The magnetic force control device of claim 1, wherein the stationary magnet is disposed to be closer to the first interaction surface than the rotary magnet.

7. The magnetic force control device of claim 1, wherein the coil is disposed between the rotary magnet and the second pole piece.

* * * * *